United States Patent
Mills

(10) Patent No.: US 7,448,365 B2
(45) Date of Patent: Nov. 11, 2008

(54) CONTROLLING VAPOR EMISSION IN A SMALL ENGINE FUEL TANK SYSTEM

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/818,882

(22) Filed: Jun. 18, 2007

(65) Prior Publication Data

US 2008/0041347 A1 Feb. 21, 2008

Related U.S. Application Data

(63) Continuation-in-part of application No. 11/017,584, filed on Dec. 20, 2004, now Pat. No. 7,234,452.

(51) Int. Cl.
*F02M 37/20* (2006.01)
*F02M 33/02* (2006.01)

(52) U.S. Cl. ............... 123/516; 123/520

(58) Field of Classification Search ............ 123/518, 123/519, 520, 516, 509; 137/202, 587, 43
See application file for complete search history.

(56) References Cited

U.S. PATENT DOCUMENTS

| | | | | |
|---|---|---|---|---|
| 3,465,912 A | * | 9/1969 | Froby et al. | 220/89.4 |
| 3,771,690 A | * | 11/1973 | Hunter | 220/746 |
| 3,917,109 A | * | 11/1975 | MacDonald | 220/746 |
| 5,687,778 A | * | 11/1997 | Harris | 141/59 |
| 5,927,315 A | * | 7/1999 | Kim | 137/43 |
| 5,931,183 A | * | 8/1999 | Yoshihara | 137/202 |
| 6,371,146 B1 | * | 4/2002 | Benjey | 137/2 |
| 7,104,277 B2 | * | 9/2006 | Hernandez et al. | 137/512.2 |
| 2004/0025937 A1 | * | 2/2004 | Kojima | 137/202 |

* cited by examiner

*Primary Examiner*—Mahmoud Gimie
(74) *Attorney, Agent, or Firm*—Anna M. Shih

(57) ABSTRACT

A fuel vapor emission system for small engine gas tank which does not require redesign or retooling for manufacturing of the tank. A new filler tube has the lower end positioned to cause fuel to rise rapidly in the tube before the tank is full, signaling the operator to stop refueling and maintain a vapor dome in the tank when the filler cap is replaced. A vapor vent valve is disposed in a separate access opening and includes a float operated rollover valve. The vent valve opens when a predetermined positive pressure is reached in the tank; and, a reverse flow vacuum relief valve is disposed in the vent valve. The outlet of the vent valve is intended to be connected to either a storage canister or the engine air inlet.

20 Claims, 3 Drawing Sheets

CONTROLLING VAPOR EMISSION IN A SMALL ENGINE FUEL TANK SYSTEM

This is a continuation-in-part of application U.S. Ser. No. 11/017,584 filed on Dec. 20, 2004, which is now U.S. Pat. No. 7,234,452.

BACKGROUND OF THE INVENTION

The present invention relates to fuel tank systems for small engines of the type employed for portable appliances such as portable power generating sets, garden tractors, lawn mowers and other such devices where the fuel tank is either mounted on the engine or closely adjacent thereto. Fuel tanks of this type are typically refueled by removing the filler cap and pouring fuel from a container having a pouring spout, or by pouring from a container and using a funnel.

Small engine fuel systems have recently been subjected to mandated requirements for fuel vapor emission control and it has been required to prevent vapor emission from the tank during operation and when the engine is not operating.

Heretofore small engine fuel systems have often employed a tank having an open vent in the filler cap for providing make-up air in the tank as fuel was withdrawn but which permitted escape of fuel vapor to the atmosphere.

In order to meet the requirement that a fuel tank for a small engine not emit fuel vapor, the filler cap must be sealed to prevent fuel vapor emission. If the filler cap is sealed then other provisions must be made for admitting make up air to the tank during engine operation. Furthermore, provisions must be made for overpressure relief. Thus, it has been desired to find a way or means of sealing a small engine fuel tank, yet provide for make-up air and over pressure relief and to do so in a cost-effective manner without requiring redesign or retooling of the tanks.

BRIEF SUMMARY OF THE INVENTION

The present invention provides a fuel vapor emission control valve in the tank which controls the flow of fuel vapor through a passage extending exteriorly of the tank and also includes a rollover or upset valve preventing liquid fuel from escaping the tank. The vapor vent valve includes a head valve which retains the vapor in the tank until a predetermined positive pressure is reached; and, the vent valve also includes a reverse flow check valve permitting make-up air to enter the tank as fuel is withdrawn or upon a sub-atmospheric pressure occurring in the tank such as, for example, by cooling of the tank. The fuel vapor vent passage may be connected externally to either a vapor storage device or the air inlet of the engine. The invention includes fitting an existing fuel tank with a filler tube extending to a predetermined level or depth in the tank to cause the fuel to rise rapidly in the filler tube upon reaching the lower end of the tube during refueling to signal the operator that tank has reached the desired fill level. This arrangement prevents overfilling and preserves a vapor dome in the tank above the liquid level of the fuel to ensure proper functioning of the vapor vent valve.

DETAILED DESCRIPTION OF THE INVENTION

Figure 1:
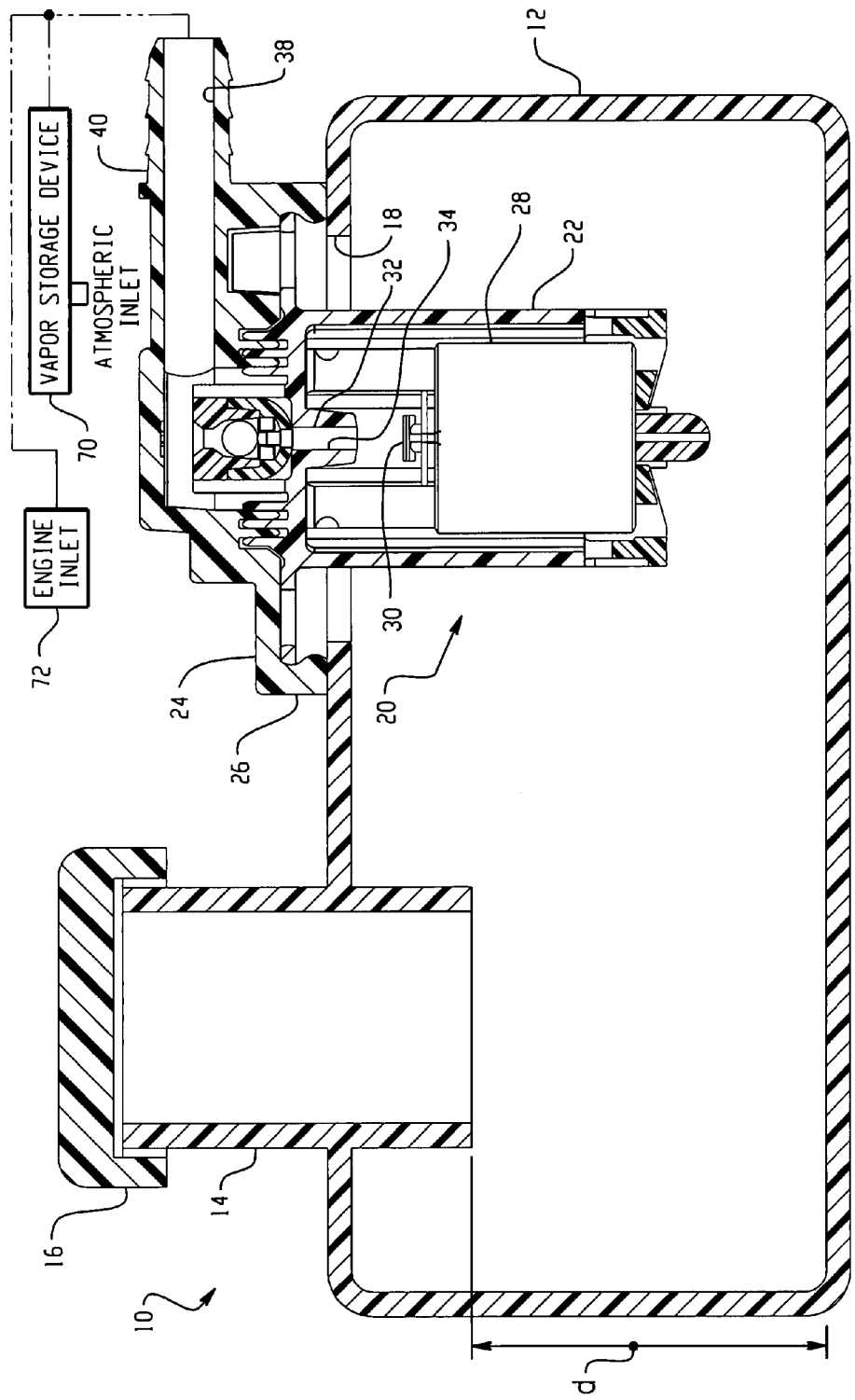
FIG. 1 is a pictorial schematic showing a small engine fuel tank in cross-section with the filler tube and vapor vent valve of the present invention installed thereon; and, the connections to either a vapor storage device or alternatively the engine air inlet are shown in dashed line.
Figure 2:
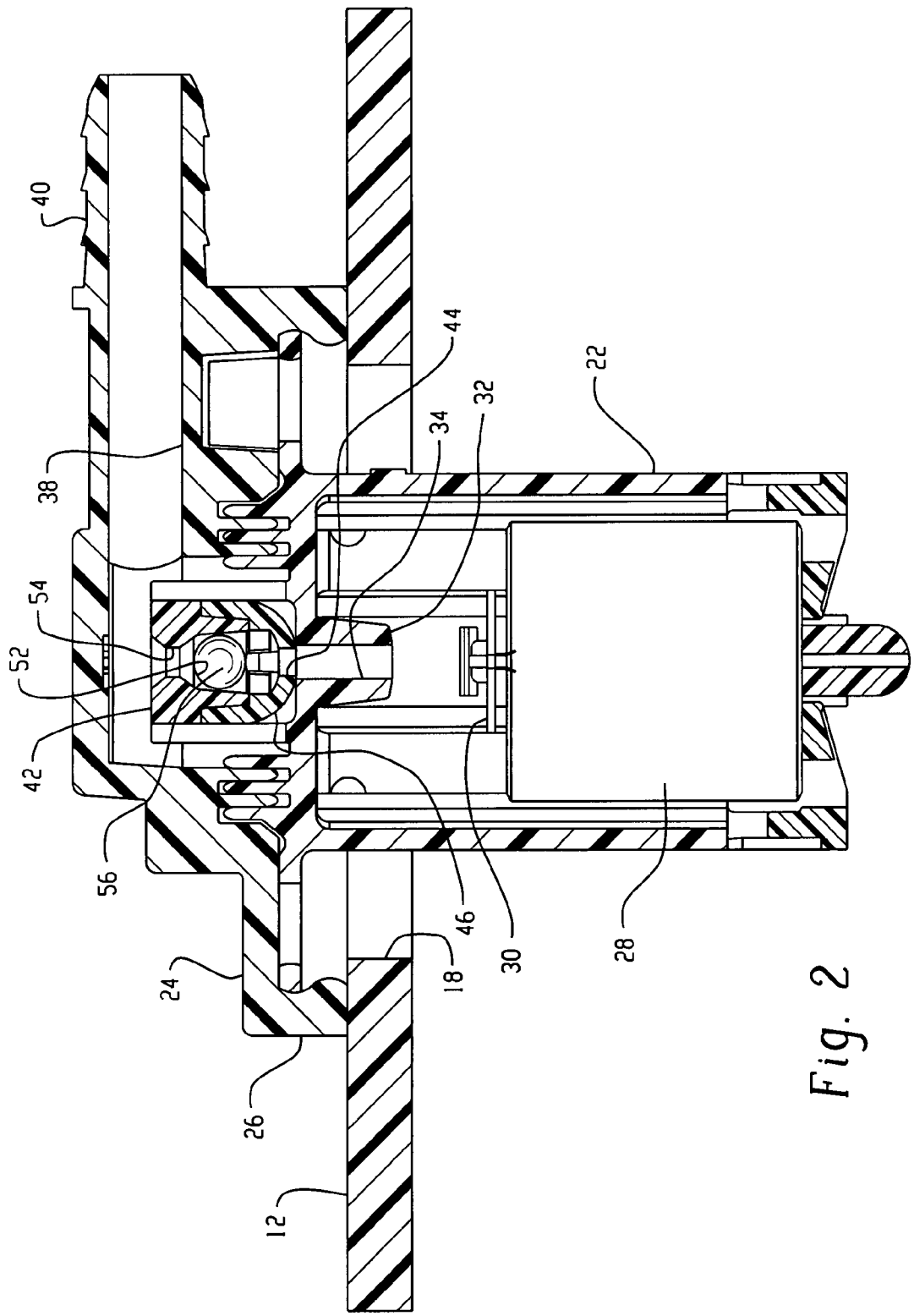
FIG. 2 is an enlarged detail of the vapor vent valve of FIG. 1.

Referring to FIGS. 1 and 2, the small engine fuel tank assembly of the present invention is indicated generally at 10 and includes an existing tank wall structure 12 with a new filler tube 14 having a vapor tight removable closure 16 received on the exterior end of the tube with the lower end of the tube 14 extending into the tank to a desired depth or level indicated by the reference character d.

A separate access opening 18 is formed in the upper portion of the tank wall and through which is inserted a combination rollover and vapor vent valve indicated generally at 20 which has a lower housing portion 22 extending into the tank and an upper housing portion 24 with an outwardly extending flange 26 therebout attached to the tank wall and sealed thereabout by any suitable expedient as, for example, weldment.

The lower valve housing 22 has a float 28 disposed therein with a flexible valve member 30 disposed on the upper end of the float which closes in the event that fuel rises above the level d due to sloshing, overfilling or the tank becoming severely tipped or inverted, under which conditions valve member 30 seats upon a valve seat 32 formed in the upper housing 24.

The valve seat 32 is formed on the lower end of a vent passage 34 which communicates with an enlarged diameter upper portion 36 which communicates with vent passage 38 which extends outwardly through attachment fitting 40 which may be formed as part of the upper housing 24.

The enlarged diameter portion 36 of the vent passage has slidably received therein a valve member 42 which has a passage 44 therethrough and which has the lower surface 46 thereof configured to seat upon surface 48 formed in the upper body at the upper end of passage 34. When the valve member 42 is in the lower position shown in FIG. 3 and FIG. 5, flow through passage 34 must transit through passage 44, not the enlarged diameter passage 36.

Valve member 42 has formed therein a valving chamber 50 with a valve seat 52 formed in an inverted position therein on the lower end of the flow passage 54 which communicates with vent passage 38. Chamber 50 has received therein a check valve member 56 which may be in the form of a relatively light weight ball which may be formed of plastic and which seats on valve set 52 and closes passage 54 when a positive pressure exists in the fuel tank.

Figure 5:
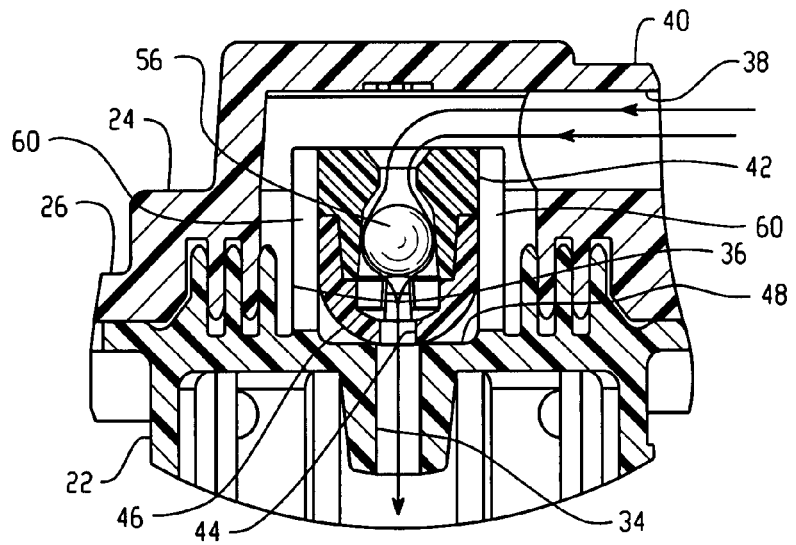
FIG. 5 is a view similar to FIG. 3 with the reverse flow valve shown open in response to a vacuum in the tank.
Figure 4:
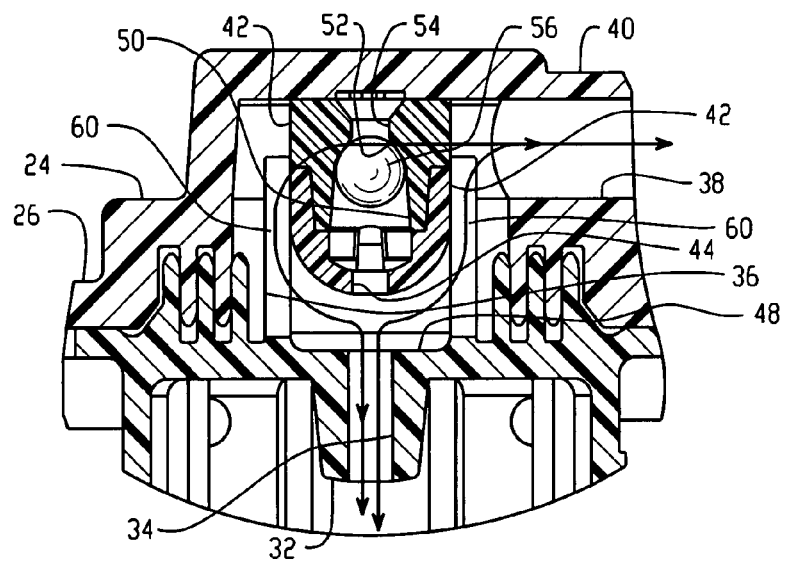
FIG. 4 is a view similar to FIG. 3 showing the vapor vent valve opened.
Figure 3:
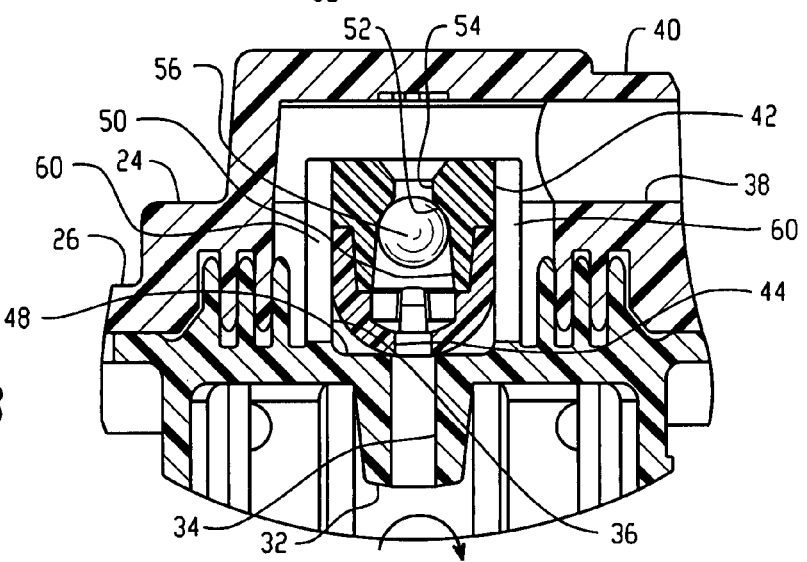
FIG. 3 is an enlarged view of a portion of FIG. 2 with the vapor vent valve closed.

With reference to FIGS. 3, 4 and 5, it will be seen that the enlarged diameter 36, in which valve member 42 slides, has slots or passages 60 formed therein to permit passage of vapors for communication with passage 38 when the valve member 42 is in the upward position and not seated on the seating surface 48.

In operation, with the filler cap 16 removed and the tank refueled through filler tube 14, when the level of the fuel reaches the height d, with continued filling a fuel level increases rapidly in the tube 14 giving visual notice to the operator that the tank has reached the desired fill level. After refueling when the filler cap is replaced, the tank is sealed except for vent passage 38 so long as the tank is in the upright position or is not substantially tilted so as to cause float valve 30 to close on valve seat 32.

If the vapor pressure in the tank is substantially atmospheric or only slightly above, the valve member 42 is seated on seating surface 48 and only a small amount of vapor can enter the valving chamber 50 and the flow therethrough passage 44 causes ball valve 56 to seat against the seating surface 52 as shown in FIG. 3 preventing escape of vapor. As the vapor pressure increases, valve member 42 is moved upwardly to the position as shown in FIG. 4 permitting passage of vapor through passages 60 into the passage 38; and, as shown in FIG. 1, to either a storage device 70 or to the engine air inlet 72.

In the event that the tank is suddenly cooled and the vapor pressure in the tank drops below atmospheric, creating a vacuum in the tank, ball valve member 56 drops from its upper seat 52 allowing make-up air to enter the tank. It will be understood that this condition can also occur as fuel is withdrawn from the tank.

The present invention thus provides a simple, relatively low cost and easy to install technique for modifying an existing small engine fuel tank for control of fuel vapor emissions to meet current requirements. The invention combines a filler tube extending in the tank to maintain a vapor dome with a vapor vent control/rollover valve to prevent fuel vapor from escaping to the atmosphere upon connection to either a storage device or the engine air inlet.

Although the invention has hereinabove been described with respect to the illustrated embodiments, it will be understood that the invention is capable of modification and variation and is limited only by the following claims.

What is claimed is:

1. A small engine fuel tank vapor emission control system comprising:
   a fuel tank for use with a small engine;
   a vapor vent valve having a valving chamber and disposed to receive vapor from within the tank and including a vent outlet, wherein the vapor vent valve closes the vent outlet when the fuel level rises to a predetermined level in the tank, and wherein a diameter of the valving chamber is greater at an end of the valving chamber than at a mid-point of the valving chamber;
   a fill level device disposed through a wall of the tank and configured to provide visual notice that the fuel in the tank has reached the predetermined level; and,
   a normally closed check valve disposed to block vapor flow in said vent outlet and operable to open at a predetermined vapor pressure in the tank.

2. The system defined in claim 1, wherein the vapor vent valve includes a bleed port bypassing the check valve for permitting a limited flow when the check valve is in the normally closed position.

3. The system defined in claim 1, wherein the check valve acts as a vacuum relief valve operable upon occurrence of sub-atmospheric pressure in the tank to permit reverse flow of vapor from the canister to the tank.

4. The system defined in claim 1 wherein the check valve is a vacuum relief valve that includes a spherical valve member moveable with respect to a valve seat formed in a valving chamber within the vapor vent valve.

5. The system defined in claim 1, wherein said vent outlet is connected to at least one of a vapor storage device and an engine air inlet.

6. The system defined in claim 1, wherein the fill level device is a lower end of the filler tube that extends into the tank such that the lower end is closed by liquid fuel rising in the tank during refueling before the vapor vent valve closes.

7. The system defined in claim 1, wherein a portion of said fill level device disposed through the wall of the tank is less than a remaining portion of said fill level device disposed externally to the wall of the tank.

8. A method of controlling vapor emission from a small engine fuel tank comprising:
   forming a fuel tank;
   disposing a vapor vent valve for communicating fuel vapor in the tank from the valve outlet to a canister and closing the vent valve when fuel in the tank reaches a predetermined level, the vapor vent valve having a valving chamber with a diameter at an end of the valving chamber greater than at a mid-point of the valving chamber;
   disposing a fill level device through a wall in the fuel tank, wherein the fill level device is located to respond to liquid fuel rising in the tank to provide visual notice that the fuel in the tank has reached the predetermined level; and,
   disposing a normally closed check valve in the valve outlet of the vent valve to prevent vapor flow to one of a canister and an engine air inlet until the vapor pressure reaches a predetermined level above atmospheric pressure.

9. The method defined in claim 8, further comprising the step of forming a bleed passage for bypassing the check valve with a limited flow.

10. The method defined in claim 8, further comprising disposing a vacuum relief valve and opening the relief valve upon the occurrence of sub-atmospheric pressure in the tank to permit vapor flow from the canister to the tank.

11. The method defined in claim 8, wherein the step of disposing the fill level device comprises extending one end of the filler tube to a desired level of fuel fill in the tank.

12. A method of controlling venting of fuel vapor in a small engine fuel tank comprising:
   disposing a filler tube through a wall of the tank and extending one end of the tube to a desired level of fuel fill in the tank, wherein the filler tube is configured to provide visual notice that the fuel in the tank has reached the desired level of fuel fill;
   disposing a float operated vent valve in the tank, wherein the vent valve has a valving chamber and vents vapor and closes in response to a rising fuel level, and wherein a vapor outlet of the vent valve is connected to at least one of a storage canister and an engine air inlet; and,
   disposing a check valve in the vapor outlet of said vent valve to block flow therethrough at vapor pressures less than a predetermined minimum level above atmospheric pressure, wherein the valving chamber within the vent valve has a diameter that is greater at an end of the valving chamber than at a mid-point of the valving chamber.

13. The method defined in claim 12, wherein the method further comprises permitting reverse flow through the check valve upon occurrence of sub-atmospheric pressure in the tank.

14. The method defined in claim 12, wherein said step of disposing a check valve includes forming a bleed passage bypassing the check valve for limited bleed flow when the check valve is closed.

15. A system fur maintaining a vapor dome in a small engine fuel tank connected to a vapor storage device comprising:
   a filler tube with one end extending to a predetermined level in the tank and configured to provide visual notice that a fuel level in the tank has reached the predetermined level, wherein the filler tube is closable by a user operable closure on an end of the filler tube communicating exteriorly of the tank;

a conduit defining a vapor vent path from the tank to the vapor storage device;

a pressure responsive valve having a valving chamber and disposed in the vapor vent path and operable to substantially prevent vapor flow when vapor pressure in the tank remains below a predetermined threshold and to substantially permit vapor flow to the vapor storage device when the vapor pressure in the tank reaches the threshold, wherein upon removal of said closure and refueling through said tube, fuel reaching the predetermined level causes fuel to reach different levels in the filler tube and in the tank to provide visual notice of the fill level and preserve a vapor dome in the tank, and wherein the valving chamber has a diameter that is greater at an end of the valving chamber than at a mid-point of the valving chamber.

16. The system defined in claim 15, wherein the pressure responsive valve includes a valve member that is moveable to close against a valve vent seat to prevent vapor flow, and a bleed passage bypassing the valve member for permitting limited bleed flow.

17. The system defined in claim 15, wherein the valve member has a spherical configuration.

18. The system defined in claim 15, wherein the pressure responsive valve includes a pressure relief valve.

19. The system defined in claim 15, wherein the pressure relief valve includes a reverse flow vacuum relief valve.

20. The system defined in claim 19, further comprising a float operated valve operable to block the vent path when the fuel level in the tank reaches a full level.

* * * * *